United States Patent
Shen

(10) Patent No.: US 7,492,128 B2
(45) Date of Patent: Feb. 17, 2009

(54) DYNAMIC DISTRIBUTION DEVICE FOR BATTERY POWER LOOP

(75) Inventor: Feng-Min Shen, Taipei (TW)

(73) Assignee: FlexMedia Electronics Corp., Hsinchu County (TW)

( * ) Notice: Subject to any disclaimer, the term of this patent is extended or adjusted under 35 U.S.C. 154(b) by 225 days.

(21) Appl. No.: 11/306,497

(22) Filed: Dec. 30, 2005

(65) Prior Publication Data

US 2007/0152627 A1    Jul. 5, 2007

(51) Int. Cl.
 *H01M 10/46* (2006.01)
(52) U.S. Cl. ............... 320/132; 323/282; 307/149
(58) Field of Classification Search ......... 323/222–224, 323/282–284; 320/103, 116, 119, 121, 132; 307/35, 39, 149, 151
See application file for complete search history.

(56) References Cited

U.S. PATENT DOCUMENTS 5,886,508 A * 3/1999 Jutras ..................... 323/267
6,018,229 A * 1/2000 Mitchell et al. ............ 320/112
6,081,104 A * 6/2000 Kern ........................ 323/268
6,891,355 B2 * 5/2005 Kernahan .................. 323/282
6,914,412 B2 * 7/2005 Wang et al. ............... 320/103

* cited by examiner

*Primary Examiner*—Rajnikant B Patel
(74) *Attorney, Agent, or Firm*—Jianq Chyun IP Office

(57) ABSTRACT

A dynamic distribution device for a battery power loop is provided. The dynamic distribution device comprises a voltage sensing module, a power management logic, a power switch circuit, a buck loop and a boost loop. The voltage-sensing module is electrically connected to a battery and is adopted for sensing a battery voltage of the battery. The power managing logic is electrically connected to the voltage-sensing module and is adopted for receiving a sensing result from the voltage-sensing module. The power switch circuit is electrically connected to the power managing logic and is adopted for operating correspondingly to a control command from the power managing logic. The buck loop is electrically connected to the power switch circuit and is adopted for lowering inputted voltage. The boost loop is electrically connected to the power switch circuit and is adopted for raising inputted voltage.

5 Claims, 3 Drawing Sheets

DYNAMIC DISTRIBUTION DEVICE FOR BATTERY POWER LOOP

BACKGROUND OF INVENTION

1. Field of the Invention

The present invention generally relates to a dynamic power distribution device for a battery power loop, and particularly to a dynamic power distribution device capable of reducing efficacy loss occurring during voltage conversion, and also makes replacement of the buck-boost power loop with the low cost of the buck loop and the boost loop possible to effectively reduce the manufacturing cost.

2. Description of Related Art

Most of the portable electronic devices have battery for power supply, and the Lithium ion battery is very popular because of the advantageous features, such as higher energy density, higher operation voltage, larger usable temperature range and longer life span. The Lithium ion battery is rechargeable. The Lithium ion battery comprises a positively charged Li alloy dioxide, an organic electrolyte and a negatively charged carbon. A membrane is disposed in between the positive and negative ports to avoid short circuit, and the organic electrolyte is contained in the plastic membrane with a plurality of holes to conduct the charged ion.

The saturation voltage of the general Lithium ion battery is 4.2 volt, and the termination voltage is 3.0 volt or even lower than 2.75 volt. Such an operation voltage range causes problems of efficiently using the battery for majority of the semiconductor with an operation voltage 3.3 volt as the boost and buck converter must be set together. For reaching a stable output voltage, the buck-boost converter is generally used, or the boost converter is used in advance and then the buck converter is utilized for outputting stable 3.3 volt. However, these methods have several defects, for example, the cost of the buck-boost converter is high, and when the input voltage equals the output voltage, loud noise occurs. The use of the boost converter and the buck converter substantially increases efficacy loss due to plurality of conversions. Furthermore, for the single channeled power component, the cost of using the buck converter loop is lower than using the boost converter loop and the buck-boost converter. Thus, the manufacturing cost is accordingly high.

Therefore, how to overcome the above defects of the conventional art is an important issue for the manufacturers in the field.

SUMMARY OF THE INVENTION

According to an aspect of the present invention, the voltage-sensing module is adopted for sensing the battery voltage ($V_{bat}$), wherein when the battery voltage ($V_{bat}$) is higher than the system output voltage ($V_{sys}$), the battery voltage ($V_{bat}$) is adjusted by the buck loop to the system voltage ($V_{sys}$) for outputting and when the battery voltage ($V_{bat}$) is lower than the system voltage ($V_{sys}$), the battery voltage ($V_{bat}$) is adjusted by the boost loop to raise the voltage and the buck loop further lowers the battery voltage ($V_{bat}$) to the system voltage ($V_{sys}$) for outputting. Thus the efficacy loss can be substantially reduced during the voltage conversion.

According to another aspect of the present invention, it is possible to replace the buck/boost loop with the low cost of the buck loop and the boost loop. Thus, the manufacturing cost of the dynamic distribution device for the battery power loop may be effectively reduced. Besides, the use of a plurality of buck loops can reduce the cost of power system with a plurality of channels.

According to another aspect of the present invention, the power managing logic has the minimum voltage and the maximum voltage to avoid the voltage vibration caused due to ripple, and also the gray zone on the analogue circuit may be eliminated.

DETAIL DESCRIPTION OF THE INVENTION

Figure 1:
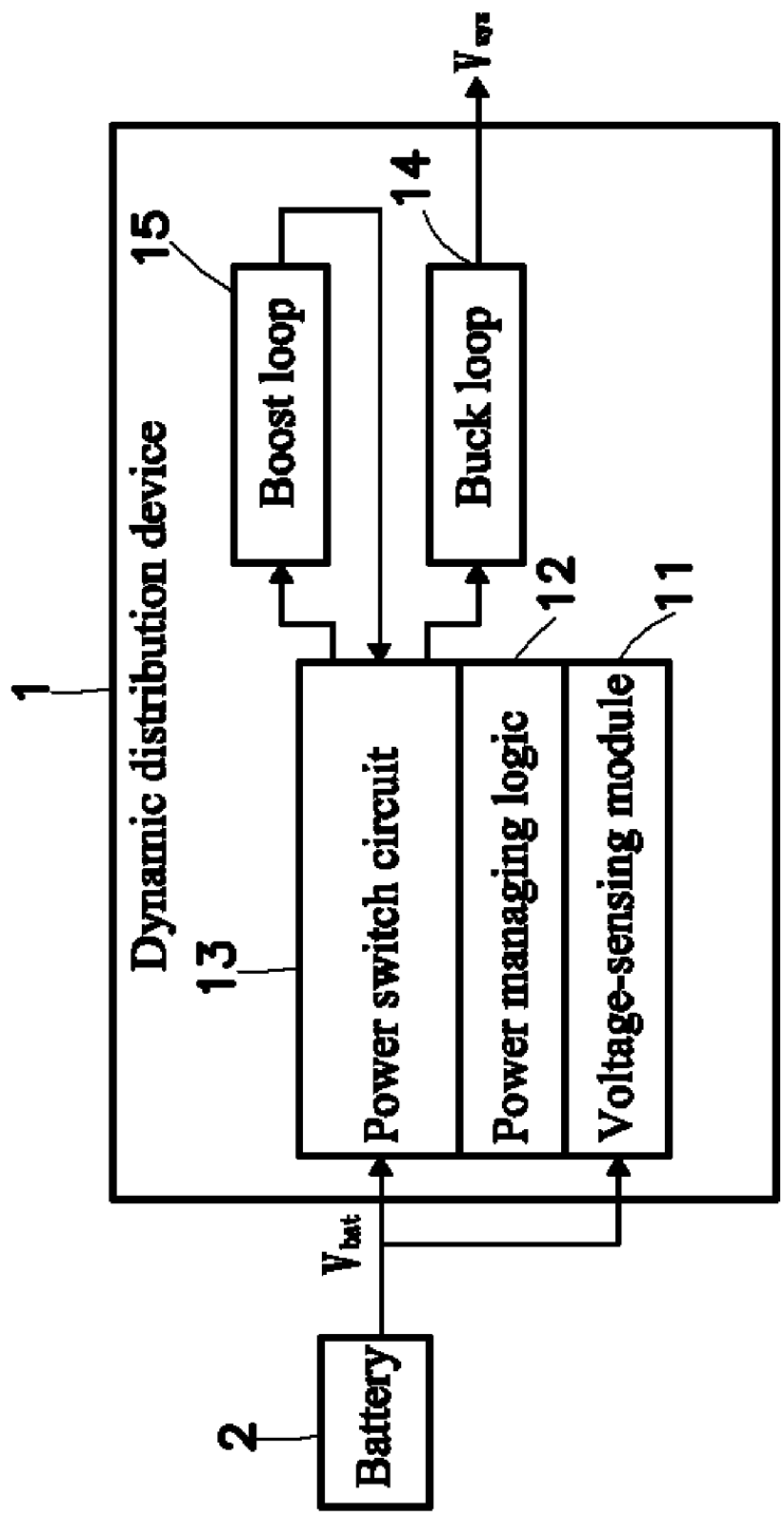
FIG. 1 is a block diagram of a dynamic distribution device according to an embodiment of the present invention.

Referring to FIG. 1, a dynamic distribution device 1 for a battery power loop comprises a voltage-sensing module 11, a power managing logic 12, a power switch circuit 13, a buck loop 14 and a boost loop 15.

The voltage-sensing module 11 is electrically connected to a battery 2 and is adopted for sensing a battery voltage ($V_{bat}$) of the battery 2.

The power managing logic 12 is electrically connected to the voltage-sensing module 11 and is adopted for receiving a sensing result from the voltage-sensing module 11.

The power switch circuit 13 is electrically connected to the power managing logic 12 and is adopted for operating correspondingly to a control command from the power managing logic 12.

The buck loop 14 is electrically connected to the power switch circuit 13 and is adopted for lowering an inputted voltage.

The boost loop 15 is electrically connected to the power switch circuit 13 and is adopted for raising an inputted voltage.

To operate the dynamic distribution device 1 for the battery power loop, the voltage-sensing module 11 is used to sense a battery voltage ($V_{bat}$) of the battery 2, such as a Lithium ion battery, and the voltage sensing module 11 transmits a sensing result to the power managing logic 12. When the power managing logic 12 determines that the battery voltage ($V_{bat}$) is higher than a system output voltage ($V_{sys}$), the power switch circuit 13 switches the power route to the buck loop 14 for lowering the battery voltage ($V_{bat}$) of the battery 2 to the system output voltage ($V_{sys}$) and when the power managing logic 12 determines that the battery voltage ($V_{bat}$) is lower than the system output voltage ($V_{sys}$), the power switch circuit 13 switches the power route to the boost loop 15 for raising the battery voltage ($V_{bat}$). After raising the battery voltage ($V_{bat}$), the battery voltage ($V_{bat}$) is further adjusted by the buck loop 14 for lowering the battery voltage ($V_{bat}$) to the system output voltage ($V_{sys}$). Thus, the efficacy loss occurring during the voltage conversion can be effectively reduced.

Figure 2:
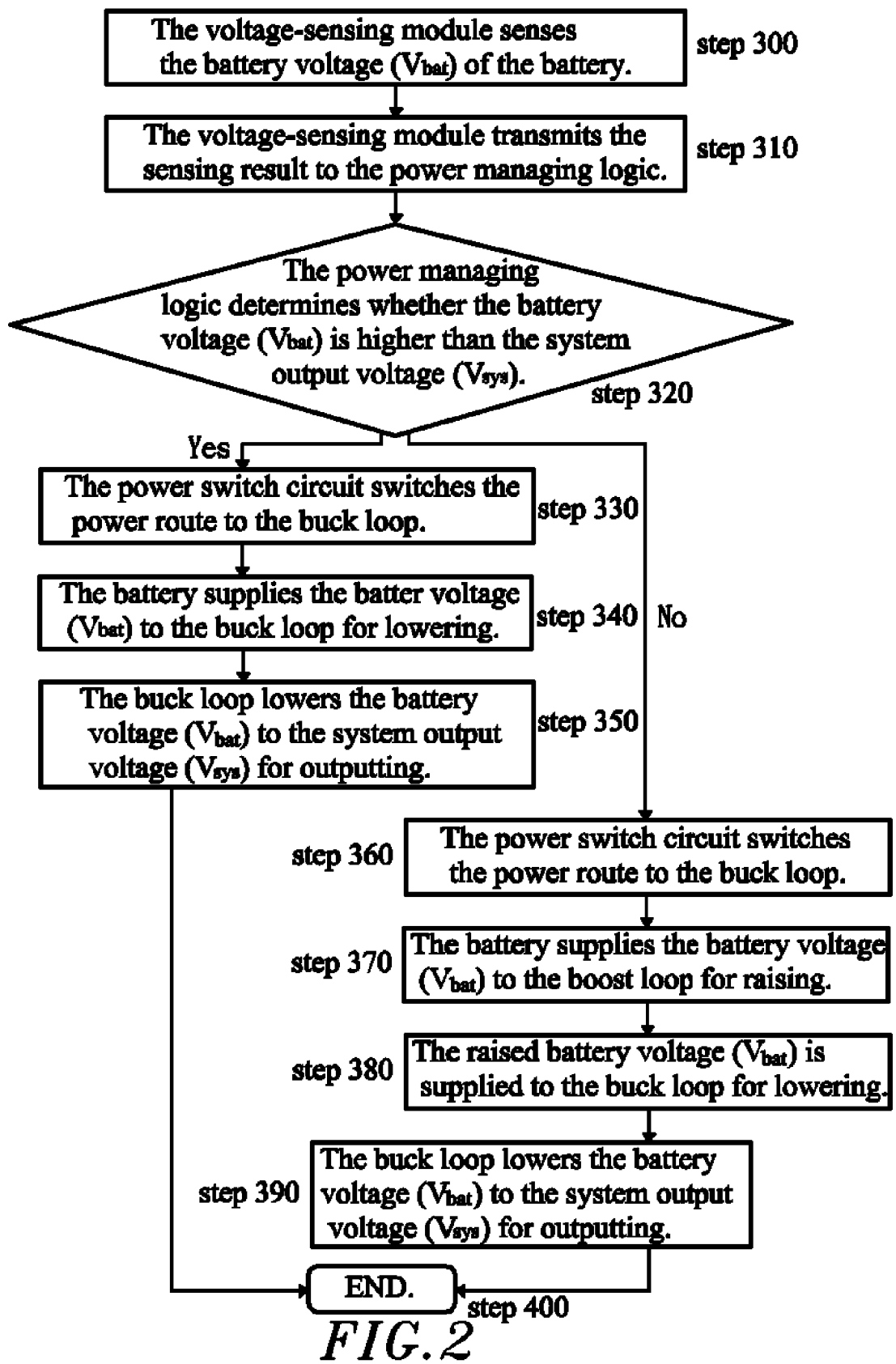
FIG. 2 is a flowchart of an operation of the dynamic distribution device according to an embodiment of the present invention.

Hereinafter, the operation of the dynamic distribution device 1 according to an embodiment of the present invention is described with reference to FIGS. 1 and 2.

At step 300, the voltage-sensing module 11 senses the battery voltage ($V_{bat}$) of the battery 2.

At step 310, the voltage-sensing module 11 transmits the sensing result to the power managing logic 12.

At step 320, the power managing logic 12 determines whether the battery voltage ($V_{bat}$) is higher than the system output voltage ($V_{sys}$). If the battery voltage ($V_{bat}$) is higher than the system output voltage ($V_{sys}$), the procedure precedes step 330, otherwise the procedure proceeds to step 360.

At step 330, the power switch circuit 13 switches the power route to the buck loop 14.

At step 340, the battery 2 supplies the battery voltage ($V_{bat}$) to the buck loop 14 for lowering.

At step 350, the buck loop 14 lowers the battery voltage ($V_{bat}$) to the system output voltage ($V_{sys}$) for outputting, and then the procedure proceeds to step 400.

At step 360, the power switching circuit 13 switches the power route to the boost loop 15.

At step 370, the battery 2 supplies the battery voltage ($V_{bat}$) to the boost loop 15 for raising.

At step 380, the raised battery voltage ($V_{bat}$) is supplied to the buck loop 14 for lowering.

At step 390, the buck loop 14 lowers the battery voltage ($V_{bat}$) to the system output voltage ($V_{sys}$) for outputting, and then procedure proceeds to step 400.

At step 400, the procedure ends.

The user may further set up a minimum voltage ($V_{th\_l}$) and a maximum voltage ($V_{th\_h}$) in the power managing logic 12, wherein the minimum voltage ($V_{th\_l}$) equals to the system output voltage ($V_{sys}$) plus an adjusted value, and the maximum voltage ($V_{th\_h}$) equals to the system output voltage ($V_{sys}$) plus a maximum value. After the voltage-sensing module 11 senses the battery voltage ($V_{bat}$) of the battery 2, and the power managing logic 12 determines that the battery voltage ($V_{bat}$) is higher than the minimum voltage ($V_{th\_l}$), the power switch circuit 13 switches the power route to the buck loop 14 to lower the battery voltage ($V_{bat}$) of the battery 2 and after the voltage-sensing module 11 senses the battery voltage ($V_{bat}$) of the battery 2, and the power managing logic 12 determines that the battery voltage ($V_{bat}$) is lower than the minimum voltage ($V_{th\_l}$), the power switch circuit 13 switches the power route to the boost loop 15 to raise the battery voltage ($V_{bat}$) and then further lowers the battery voltage ($V_{bat}$) by the buck loop 14 in order to provide a stable system output voltage ($V_{sys}$). If the battery voltage ($V_{bat}$) is restored to the maximum voltage ($V_{th\_h}$) in the process, the power managing logic 12 gives a control command to the power switching circuit 13 to switch the power route to the buck loop 14. So by using the limitation between the minimum voltage ($V_{th\_l}$) and the maximum voltage ($V_{th\_h}$), the voltage vibration caused by the ripple can be prevented, and the gray zone on the analogue circuit can be eliminated.

The values of the minimum voltage ($V_{th\_l}$) and the maximum voltage ($V_{th\_h}$) can be set according to the load of the system and the peripheral components in order to promote the efficiency of the dynamic distribution device 1.

Figure 3:
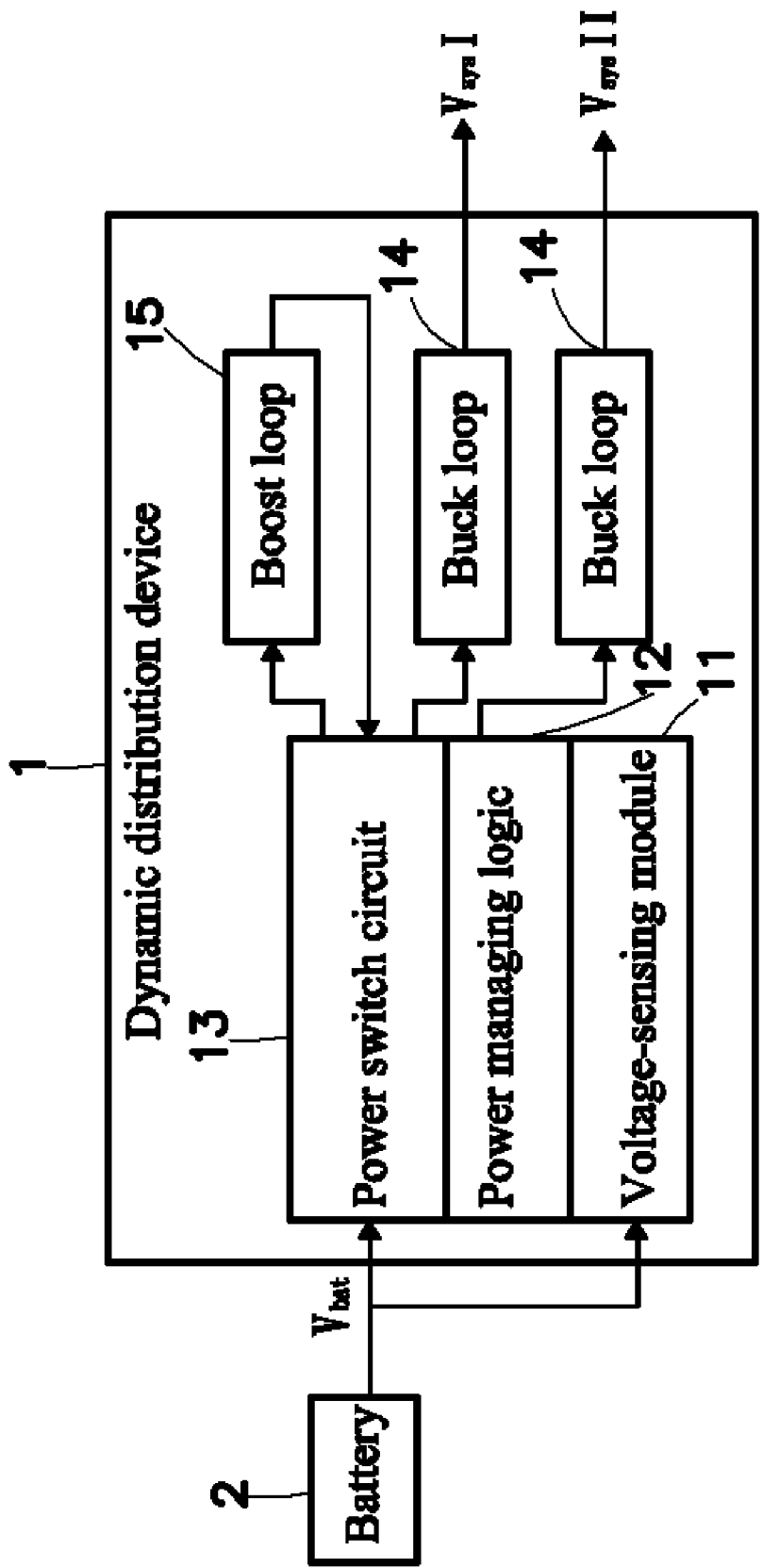
FIG. 3 is a block diagram of a dynamic distribution device according to another embodiment of the present invention.

Referring to FIG. 3, the dynamic distribution device 1 for the battery power loop may comprise one or a plurality of the buck loops 14. The different buck loops 14 provide various system output voltages ($V_{sys}$), for example, a system output voltage ($V_{sys}1$) and a system output voltage ($V_{sys}11$), thus provides various choices for the user to select to promote the convenience and the efficacy.

Accordingly, the dynamic distribution device 1 for the battery power loop of the present invention has the following advantages.

1. The dynamic distribution device of the present invention comprises the voltage sensing module 11 to sense the battery voltage ($V_{bat}$) of the battery 2 and the power managing logic 12 gives the control command to the power switch circuit 13 for switching the power route to the buck loop 14 or the boost loop 15 to adjust the battery voltage ($V_{bat}$) to the system output voltage ($V_{sys}$), thus the efficacy loss occurring during the voltage conversion can be effectively reduced.

2. Because the low cost of the buck loop 14 and the boost loop 15 are used to replace the buck/boost loop, and the power switch circuit 13 is adopted for switching the power route to the buck loop 14 or the boost loop 15, therefore the manufacturing cost of the dynamic distribution device 1 for the battery power loop can be effectively reduced.

3. The minimum voltage ($V_{th\_l}$) and the maximum voltage ($V_{th\_h}$) may be set to prevent the voltage vibration caused by the ripple and also the gray zone on the analogue circuit may be eliminated.

4. The different buck loops 14 provide various system output voltages ($V_{sys}$), for example, the system output voltage ($V_{sys}1$) and the system output voltage ($V_{sys}11$), thus provides various choices for the user to select to promote the convenience and the efficacy.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What is claimed is:

1. A dynamic distribution device for a battery power loop, comprising:
   a voltage-sensing module, electrically connected to a battery, for sensing a battery voltage of said battery;
   a power managing logic, electrically connected to said voltage-sensing module, for receiving a sensing result from said voltage sensing module;
   a power switch circuit, electrically connected to said power managing logic, for operating correspondingly to a control command from said power managing logic;
   a buck loop, electrically connected to said power switch circuit, for lowering said battery voltage; and
   a boost loop, electrically connected to said power switch circuit, for raising said battery voltage,
   wherein said power managing logic commands said power switch circuit for controlling said buck loop to lower said battery voltage to a system output voltage when said power managing logic determines that said battery voltage is higher than said system output voltage, and
   wherein said power managing logic commands said power switch circuit for controlling said boost loop to raise said battery voltage to a raised output voltage and controlling said buck loop to lower said raised output voltage to said system output voltage when said battery voltage is lower than said system output voltage.

2. The dynamic distribution device for a battery power loop according to claim 1, wherein said battery comprises a Lithium ion battery.

3. The dynamic distribution device for a battery power loop according to claim 1, wherein said buck loop comprise a single loop or a plurality of loops.

4. A voltage adjustment method, comprising:
   sensing a battery voltage outputted from a battery;
   determining whether said battery voltage is higher than a system output voltage;
   lowering said battery voltage to the system output voltage when said battery voltage is higher than said system output voltage; and
   raising said battery voltage to a raised output voltage and lowering said raised output voltage to said system output voltage when said battery voltage is lower than said system output voltage.

5. A dynamic distribution device for a battery power loop, comprising:
- a voltage-sensing module, electrically connected to a battery, for sensing a battery voltage of said battery;
- a power managing logic, electrically connected to said voltage-sensing module, for receiving a sensing result from said voltage sensing module;
- a power switch circuit, electrically connected to said power managing logic, for operating correspondingly to a control command from said power managing logic;
- a boost loop, electrically connected to said power switch circuit, for raising said battery voltage to a raised output voltage when said battery voltage is lower than a first system output voltage or a second system output voltage;
- a first buck loop, electrically connected to said power switch circuit, for lowering said raised output voltage to said first system output voltage; and
- a second buck loop, electrically connected to said power switch circuit, for lowering said raised output voltage to said second system output voltage

* * * * *